United States Patent [19]

Weinberger

[11] 3,761,902

[45] Sept. 25, 1973

[54] FUNCTIONAL MEMORY USING MULTI-STATE ASSOCIATIVE CELLS

[75] Inventor: Arnold Weinberger, Newburgh, N.Y.

[73] Assignee: International Business Machine Corporation, Armonk, N.Y.

[22] Filed: Dec. 30, 1971

[21] Appl. No.: 214,195

[52] U.S. Cl....... 340/273 FF, 340/173 AM, 307/238

[51] Int. Cl......................... G11c 11/40, G11c 15/00

[58] Field of Search............... 340/173 FF, 173 AM; 307/238

[56] References Cited

UNITED STATES PATENTS

| | | | |
|---|---|---|---|
| 3,543,296 | 11/1970 | Gardner et al. | 340/173 FF |
| 3,593,317 | 7/1971 | Fleisher | 340/172.5 |
| 3,609,702 | 9/1971 | Gardner et al. | 340/173 AM |

*Primary Examiner*—James W. Moffitt
*Attorney*—J. E. Murray et al.

[57] ABSTRACT

This specification discloses an associative or functional memory in which storage cells with more than four states are employed to perform logic functions. These multi-state cells can be actually a single multi-state cell or a plurality of bistable or quadrastable cells. They are addressed through their bit lines by a decoder for decoding two or more data bits and are sensed on their word lines by match detectors determining whether or not there is a match condition.

10 Claims, 10 Drawing Figures

FIG. 3
PRIOR ART

| | | L R | | | | |
|---|---|---|---|---|---|---|
| | | | 1 | 0 | 0,1 | I (SEARCH INPUT) |
| | | | 1 | 1 | 0 | M (SEARCH INPUT) |
| | | | 1 | 0 | 0 | L BIT LINE (I) |
| | | L R | 0 | 1 | 0 | R BIT LINE ($\bar{I}$) |
| TRUE ($I+\bar{I}$) | X | 0 0 | M | M | M | |
| I | 1 | 0 1 | M | N | M | |
| $\bar{I}$ | 0 | 1 0 | N | M | M | |
| FALSE (NONE) | Y | 1 1 | N | N | M | |

M = MATCH
N = MISMATCH

FIG. 4

| | 16-STATE CELL: LOGICAL NOTATION | ≡ DATA STORED IN CELLS: L1 | R1 | L2 | R2 | | | | | | |
|---|---|---|---|---|---|---|---|---|---|---|---|
| | | | | | | 1 | 1 | 0 | 0 | 0,1 | I1 (SEARCH INPUT) |
| | | | | | | 1 | 0 | 1 | 0 | 0,1 | I2 (SEARCH INPUT) |
| | | | | | | 1 | 1 | 1 | 1 | 0 | M (SEARCH INPUT) |
| | | | | | | 1 | 0 | 0 | 0 | 0 | L1 BIT LINE ($I1 \cdot I2$) |
| | | | | | | 0 | 1 | 0 | 0 | 0 | R1 BIT LINE ($I1 \cdot \overline{I2}$) |
| | | | | | | 0 | 0 | 1 | 0 | 0 | L2 BIT LINE ($\overline{I1} \cdot I2$) |
| | | | | | | 0 | 0 | 0 | 1 | 0 | R2 BIT LINE ($\overline{I1} \cdot \overline{I2}$) |
| $I1 \cdot I2 + I1 \cdot \overline{I2} + \overline{I1} \cdot I2 + \overline{I1} \cdot \overline{I2}$ = | TRUE | 0 | 0 | 0 | 0 | M | M | M | M | M | |
| $I1 \cdot I2 + I1 \cdot \overline{I2} + \overline{I1} \cdot I2$ = | $I1 + I2$ | 0 | 0 | 0 | 1 | M | M | M | N | M | |
| $I1 \cdot I2 + I1 \cdot \overline{I2} + \overline{I1} \cdot \overline{I2}$ = | $I1 + \overline{I2}$ | 0 | 0 | 1 | 0 | M | M | N | M | M | |
| $I1 \cdot I2 + I1 \cdot \overline{I2}$ = | $I1$ | 0 | 0 | 1 | 1 | M | M | N | N | M | |
| $I1 \cdot I2 + \overline{I1} \cdot I2 + \overline{I1} \cdot \overline{I2}$ = | $\overline{I1} + I2$ | 0 | 1 | 0 | 0 | M | N | M | M | M | |
| $I1 \cdot I2 + \overline{I1} \cdot I2$ = | $I2$ | 0 | 1 | 0 | 1 | M | N | M | N | M | |
| $I1 \cdot I2 + \overline{I1} \cdot \overline{I2}$ = | $\overline{I1 \forall I2}$ | 0 | 1 | 1 | 0 | M | N | N | M | M | |
| $I1 \cdot I2$ = | $I1 \cdot I2$ | 0 | 1 | 1 | 1 | M | N | N | N | M | |
| $I1 \cdot \overline{I2} + \overline{I1} \cdot I2 + \overline{I1} \cdot \overline{I2}$ = | $\overline{I1} + \overline{I2}$ | 1 | 0 | 0 | 0 | N | M | M | M | M | |
| $I1 \cdot I2 + I1 \cdot I2$ = | $I1 \forall I2$ | 1 | 0 | 0 | 1 | N | M | M | N | M | |
| $I1 \cdot \overline{I2} + \overline{I1} \cdot \overline{I2}$ = | $\overline{I2}$ | 1 | 0 | 1 | 0 | N | M | N | M | M | |
| $I1 \cdot \overline{I2}$ = | $I1 \cdot \overline{I2}$ | 1 | 0 | 1 | 1 | N | M | N | N | M | |
| $\overline{I1} \cdot I2 + \overline{I1} \cdot \overline{I2}$ = | $\overline{I1}$ | 1 | 1 | 0 | 0 | N | N | M | M | M | |
| $\overline{I1} \cdot I2$ = | $\overline{I1} \cdot I2$ | 1 | 1 | 0 | 1 | N | N | M | N | M | |
| $\overline{I1} \cdot \overline{I2}$ | $\overline{I1} \cdot \overline{I2}$ | 1 | 1 | 1 | 0 | N | N | N | M | M | |
| (NONE) = | FALSE | 1 | 1 | 1 | 1 | N | N | N | N | M | |

M = MATCH
N = MISMATCH

FUNCTIONAL MEMORY USING MULTI-STATE ASSOCIATIVE CELLS

BACKGROUND OF THE INVENTION

This invention relates to functional memories and more particularly to the accessing of these memories so as to perform logic functions within the memory matrix.

In Gardner et al. U.S. Pat. No. 3,543,296 a functional memory employing four-state cells is illustrated. These cells are each addressed by a single binary input which is complemented and fed through a mask to the balanced bit lines of each cell to interrogate the cell for match or no match conditions. With this functional memory arrangement it is possible to store four states of information, three of which are decipherable in the associative memory configuration. In other words, in three of the states it is possible to obtain a match condition when interrogated through the unmasked bit lines of the memory and in the fourth state it is impossible to obtain a match condition when so interrogated. The three states which are decipherable are called the 0, the 1 and the X or don't care states. The fourth state, or the undecipherable state, is referred to as the Y state.

In interrogating the cell for state, logic is being performed. Thus the functional memory is capable of performing logic. However, because only three out of four logic states of each cell are decipherable by the configuration, 25 percent of the logic power of the array is lost. Furthermore, with the four-state associative cell arrangement only very simple logic functions can be performed and to perform higher order logic functions, such as Exclusive OR functions, requires additional logic at the output of the memory and/or additional words in the memory.

BRIEF DESCRIPTION OF THE INVENTION

In Fleisher et al. U.S. Pat. No. 3,593,317 a technique is described for performing the logic in ordered arrays. In accordance with the present invention the technique described there is applied to functional memories to increase the logic power of such functional memories by minimizing undecipherable states and permitting the performance of higher order logic functions. In accomplishing this the present invention employs storage cells with more than four states to perform logic functions. These multi-state cells can be actually a single multi-state cell or a plurality of bistable or quadrastable cells. They are addressed through their bit lines by a decoder for decoding two or more data bits and are sensed on their word lines by match detectors determining whether or not there is a match condition. Where a sixteen-state cell is used in this arrangement, only one of the 16 possible states is non-decipherable instead of one out of four in the case of the four-state cell. Furthermore, it is possible to perform higher order functions, such as Exclusive OR functions, without the use of additional logic circuitry.

Therefore, it is an object of the present invention to provide an improved functional memory.

It is another object of the present invention to provide a functional memory with increased logic power.

Another object of the present invention is to provide a functional memory with improved efficiency.

DESCRIPTION OF THE DRAWINGS

These and other objects, features and advantages of the invention will be apparent from the preferred embodiments of the invention as illustrated in the accompanying drawings, of which:

FIG. 3 is a truth table of the possible data states of the memory shown in FIG. 1;

FIG. 4 is a truth table for a memory made in accordance with the present invention;

DESCRIPTION OF THE EMBODIMENT OF THE INVENTION

Figure 1:
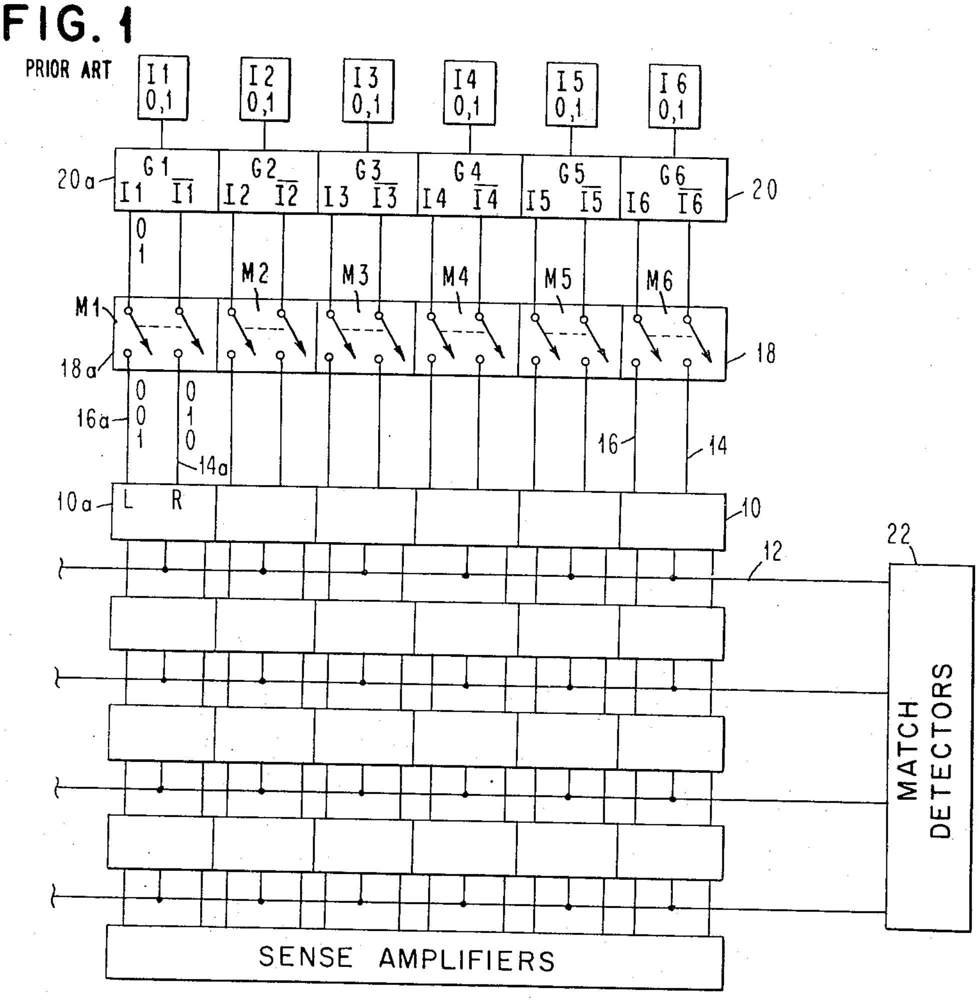
FIG. 1 PRIOR ART
FIG. 1 is an example of a functional memory assembled in accordance with the Gardner et al. U.S. Pat. No. 3,543,296.

In FIG. 1, each of the blocks 10 represents one of the four-state cells shown in the Gardner et al. patent. These cells are each accessed by a word line 12 and two bit lines 14 and 16.

In associatively interrogating the data in any given cell, signals are placed on the bit lines 14 and 16 through a mask 18 and a complement generator 20. The interrogating bit I is placed into the complement generator 20 which generates the complement of the bit $\overline{I}$ and feeds the bit I plus its complement $\overline{I}$ into the mask input. Two signals are then transmitted from the mask output to the left and right sense lines 14 and 16. The signals placed on the sense lines 14 and 16 will, of course, depend on whether the input I is a binary 1 or a binary 0 and also upon the condition of the mask 18.

Figure 2:
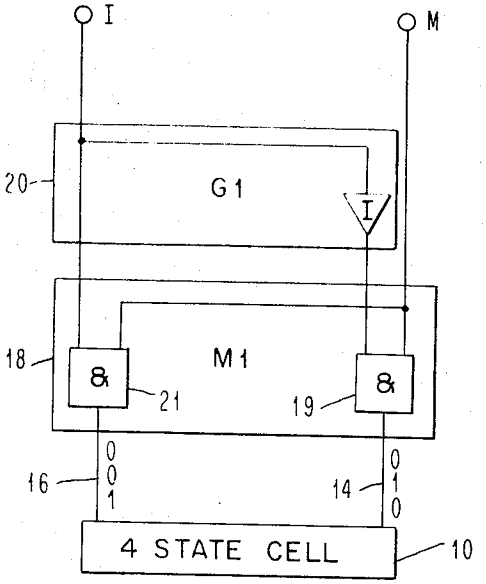
FIG. 2 PRIOR ART
FIG. 2 is a logical interpretation of the accessing of a single cell of the memory shown in FIG. 1.

In FIG. 2, the possible combinations of mask outputs to the bit lines 14 and 16 for given input I and mask conditions are illustrated and the logic equivalent of the signal generator 20 and mask 18 are shown. For instance, suppose the mask switches are open or, in other words, the mask input M is 0. Signals out of the mask would be 0 and 0 since the condition for neither of AND gates could be met irrespective of the data input I. However, if the mask signal happens to be a 1 or, in other words, the switches in the mask are closed, two different bit line signals are possible. First, if the binary input I is a 0 inverter 24 produces a 1 enabling the conditions for AND gate 19 to be met so that a binary 1 is placed on the right bit line 14 and a binary 0 is placed on the left bit line 16. Secondly, if the binary input is a 1 the conditions for the AND gate 21 are met so that a binary 1 is placed on the left bit line 16 and a binary 0 is placed on the right bit line 14.

Thus, three combinations of signals are fed to the bit lines, a 0, 0 combination, a 0, 1 combination and a 1, 0 combination. The 0, 0 combination represents a condition in which the original interrogation is masked out by the mask M. The 0, 1 combination represents a condition in which the cell is being interrogated for a 0. The 1, 0 combination is an interrogation for a binary 1. When the interrogation is masked or, in other words, the cell is interrogated by the 0, 0 combination, a match condition or no pulse will be produced on the word line. However, when the cell is interrogated by either of the other two combinations the output will depend on what is stored in the storage cell. As shown in the Gardner et al patent, the four-state storage cell 10 consists of two binary flip-flops, each flip-flop is coupled to one of bit lines 14 or 16. In functional memory language, when the flip-flop connected to the left bit line 16 stores a 0 and the flip-flop connected to the right bit line 16 stores a 1 the four-state cell 10 is in the 1 state. When a 1 is stored in the flip-flop connected to the bit line 16 and a 0 is stored in the flip-flop connected to the bit line 14, the storage cell is in the 0 state. If neither flip-flop stores a 1 then the flip-flop is in the X state and if both flip-flops store a 1 the cell is in the Y state.

FIG. 3 is a truth table of match M and no match N signals on the word line 12 for all possible combinations of interrogation signals on the bit lines 14 and 16 and data states stored in the storage cell 10. The bit line interrogation signals appear in a row across the top of the table along with the binary inputs and mask conditions that produce them. The data stored in the cell appears in a column to the left of the table along with the usual functional code notation for the various states.

It can be seen that a cell 10 storing the Y state cannot produce a match signal on its word line 12 for any unmasked combination of interrogating signals on its bit lines. Thus, for any unmasked combination of interrogating signals on its bit lines, the Y state can be used only to force a mismatch condition in the word.

Now if we redefine the meaning of the four possible states of the cell to represent the four functions of the input variable I, i.e., I, $\bar{I}$, TRUE and FALSE, we can see that each word of the functional memory is performing logic of functions of single input variables. However, the logic performed by the memory is wasteful of storage states since the function FALSE has limited use. Furthermore, the logic being performed by a cell is rudimentary since it is only a function of a single variable. In accordance with the present invention logic of two or more variables is performed by each cell in the matrix.

FIG. 4 is a truth table for performing logic with two variables in a functional memory cell. Along the top of the table is a series of parallel columns. The two top numbers in the column are the binary inputs I1 and I2. The number under that represents the state of the mask while the next four numbers indicate the output of a decode circuit that performs a decode on inputs I1 and I2, their complements $\bar{I1}$ and $\bar{I2}$, and on the mask circuit state M. Along the left side of the table are a series of 16 parallel rows containing four digits. These parallel rows represent all possible combinations of data stored in two four-state cells of the type described in the Gardner et al patent. Next to these numbers is a logic notation indicating what logic is being performed on the input signals I1 and I2 by the two four-state cells when the decoder output signals are applied to the bit lines of the memory in the manner indicated to the left of each of the decoder outputs. The central portion of the graph indicates whether a match or no match condition is indicated at the word line servicing the storage cell.

Therefore, there are 16 possible logic functions that can be accomplished when the search of a column of cells is a function of two variables, among them being an Exclusive OR function. Only one of these logic functions (FALSE) would be of little use in the associative memory arrangement since only that one function would give a no match condition irrespective of the data being placed on the input lines I1 and I2 during an unmasked condition.

Figure 6:
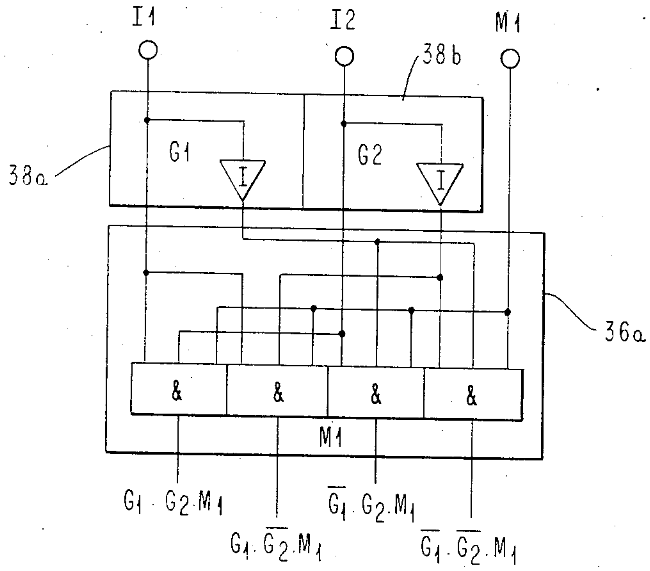
FIG. 6 illustrates the logic for accessing one of the multi-state cells shown in the memory of FIG. 5.

To implement the logic shown in FIG. 4 would require a 16-state cell. This 16-state cell could be a single 16-state cell, four two-state cells or two four-state cells such as described in the Gardner et al. reference. As shown in FIG. 6, the four AND's of the mask M1 turn out to be a decoder circuit providing ANDing of all the four possible combinations of the two inputs I1 and I2 and their complements.

Figure 5:
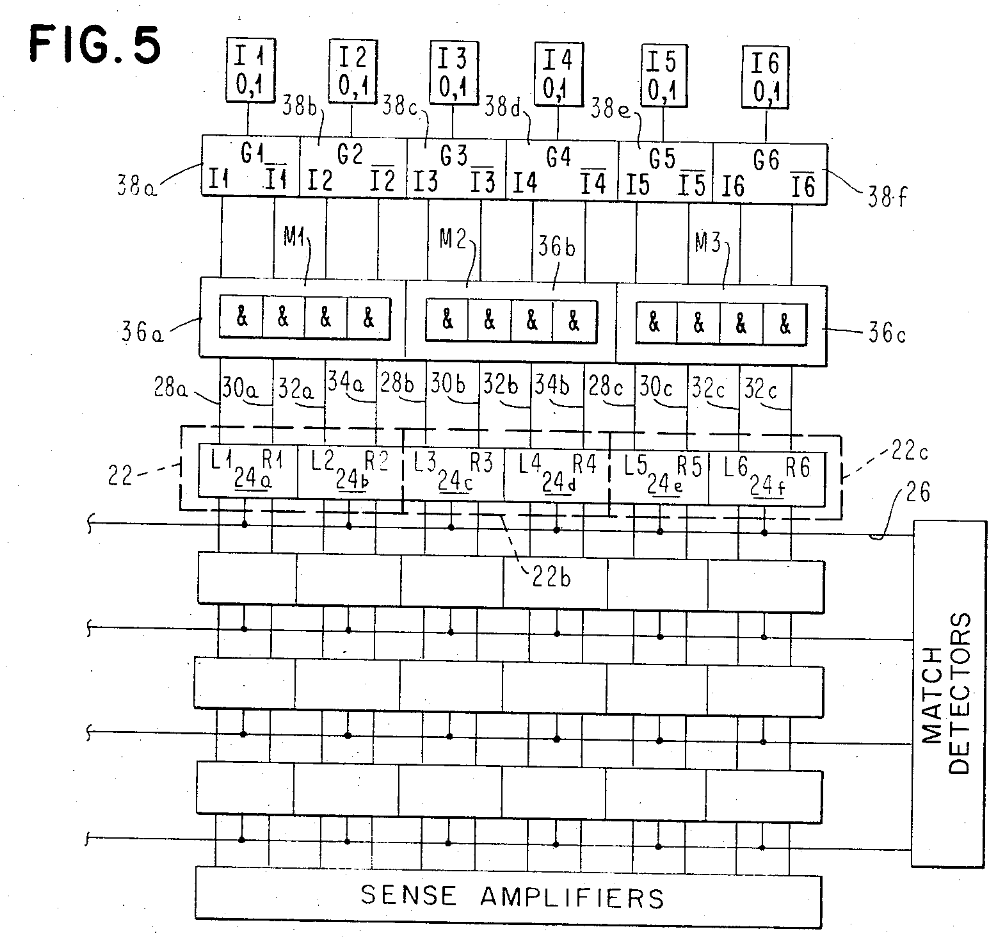
FIG. 5 is a memory matrix using the truth table shown in FIG. 4.

A matrix of the cells, in accordance with the present invention, is illustrated in FIG. 5. Each cell 22 is two four-state cells being accessed by one word line 26 and four bit lines 28 to 34. The masks 36 now become two-bit decoders ANDing all possible combinations of two inputs I1 and I2 and their complements $\bar{I1}$ and $\bar{I2}$. Thus, for instance, the four-state cells **24*a* and 24*b*, in effect, become a 16-state cell accessed by decoder 36*a*** which provides a single pulse or one input for each of the interrogation conditions provided by the various combinations of the inputs I1 and I2 and their complements $\bar{I1}$ and $\bar{I2}$.

So far we have limited our discussion to a functional memory using a two-bit decoder. However, three or more bit decoders can also be used. With a three-bit decoder there are eight output lines. Thus, the three-bit decoder would feed interrogation signals to eight two-state memory cells or four four-state memory cells or two 16-state cells to form a 256-state cell. Conventional reading and writing may be performed in the functional memories of the present invention using the technique described in the Gardner et al. patent.

Figure 7:
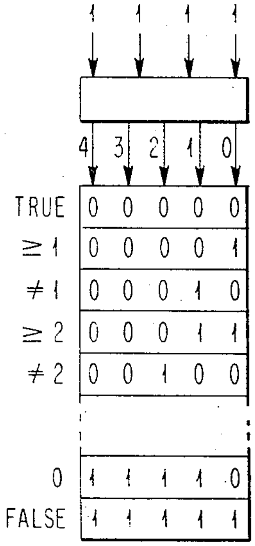
FIGS. 7, 8 and 9 show how threshold logic may be applied to the present invention.

Up to now we have shown decoders using conventional logic. However, in some cases it may be more efficient to use decoders using threshold logic to cut down the number of cells needed to perform specific logic functions. With a threshold logic decoder a number of combinations of inputs and outputs are possible. For instance, assume a four-bit threshold decoder is being used. As shown in FIG. 7, if the four lines are given equal weights it is possible to decode to at most five outputs, one output indicating all four inputs are present, one output indicating exactly three inputs are present, one output indicating exactly two inputs are present, one output indicating exactly one input is present and one output indicating no input is present. The five outputs are matched against the state of a 32-state cell that may be implemented with five bistables as shown. Each of the 32 combinations of the five bistables represents one of the 32 functions of the four equally weighted inputs.

Figure 8:
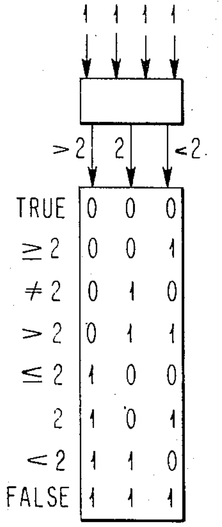

However, not all decoder outputs are always independently useful. FIG. 8 shows the case where of the four inputs of equal weight only three decoded outputs are useful, one output indicating that more than two inputs are present, one output indicating exactly two inputs are present and one output indicating less than two inputs are present. Now the three outputs are matched against the state of an eight-state cell that may be implemented with three bistables as shown. Each of the eight combinations of the three bistables represents one of the restricted set of eight permissible functions of the four equally weighted inputs.

Figure 9:
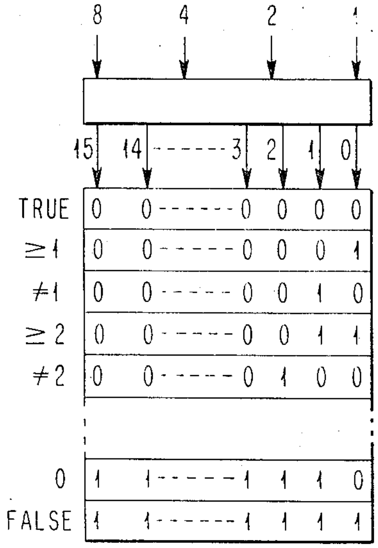

Not all inputs must be of equal weight to represent threshold conditions. For example, two of the inputs may have weight one while the other two inputs have weight two. As shown in FIG. 9, in the extreme, each of the four inputs has a different weight assigned on the basis of powers of two of successive integers, namely, 1, 2, 4 and 8. Then up to 16 different outputs are necessary to decode the four inputs or, in other words, as many as would be necessary in the case of a decoder using conventional logic.

Figure 10:
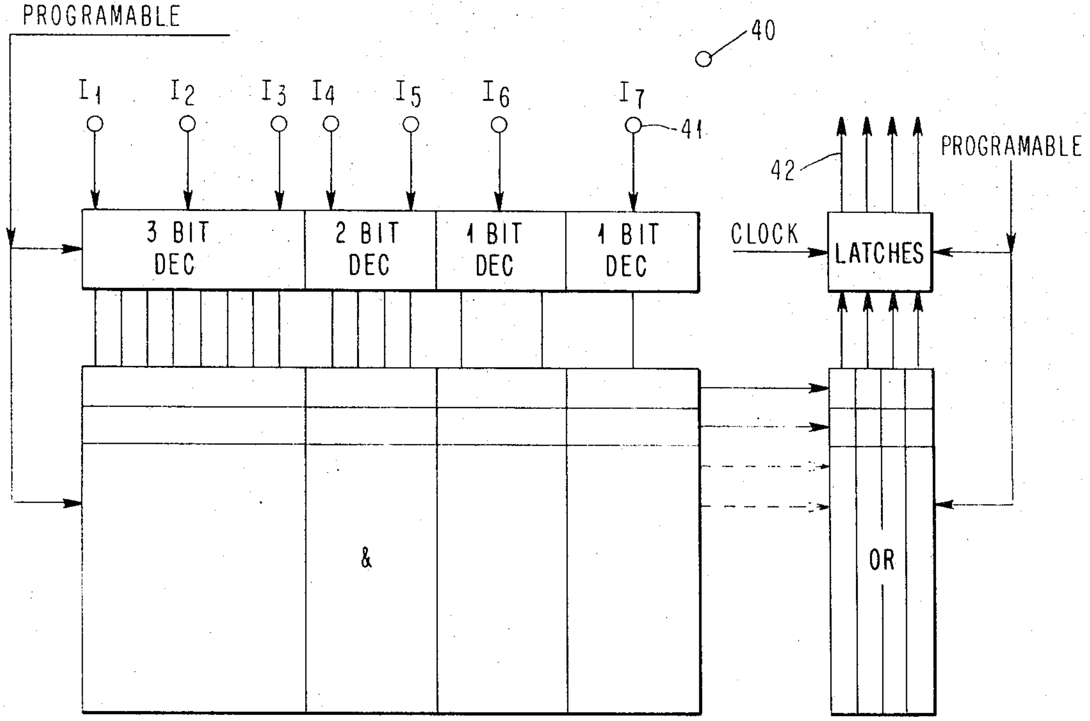
FIG. 10 illustrates the number of improvements that can be made in the arrangement shown in FIG. 4 to further increase the logic power of the functional memory.

Up until now we have discussed the memory as if all the bit decoders are the same size. Of course, this need not be the case. As is shown in FIG. 10, all possible combinations of decoder sizes can be used to perform the logic necessary using the minimum amount of cells.

Furthermore, the outputs of the memory matrix represent not only the match/mismatch relationship between the inputs and the stored functions of the matrix but also the outputs of a column of AND functions. Each AND function in turn represents the AND of the functions of the subsets. In the example, each output of the AND matrix is the AND of a function of the four input subsets, the first input subset consisting of I1, I2 and I3, the second input subset consisting of I4 and I5, the third input subset consisting of I6 and the fourth input subset consisting of I7. The AND output may be linked through another memory matrix that represents a row of OR circuits to perform additional logic. Each OR performs the OR function of selected outputs of the AND matrix. The AND matrix outputs are selected (or not selected) depending on the state 1 (or 0) of a two-state cell located in the intersection of an AND matrix output with an OR. The outputs of the OR matrix may further be entered into an array of latches appropriately clocked to perform still additional logic. Each OR matrix output is either latched or not latched before leaving the latch array. The choice for some or all can again be made by means of a two-state cell located at the latch assigned to the corresponding OR matrix. Maximum output flexibility is attained when the decoders, AND matrix cells, OR matrix cells and latches are programmable.

Finally, since it is proposed that the memory be produced on a single monolithic chip, it would be desirable to have some versatility connecting input and output pins. In this connection it is suggested that it would be possible to program the connections to a pin 40 so that it can be connected to either an input 41 or output 42 to the chip depending on which is needed.

Therefore, it should be understood by those skilled in the art that various changes in form and details may be made therein without departing from the spirit and scope of the invention.

What is claimed is:

1. In a functionl memory in which data in storage cells is interrogated by interrogating signals placed on the bit lines of the cell and responds to the interrogation by placing a match or no match signal on the word line of the cell, the improvement comprising:

a. a decoder for decoding at least two binary input signals and their complements to provide a multi-variable interrogating signal on three or more lines;

b. a multi-state cell having more than four states in a plurality of two state positions each with a bit line coupled to one of the three or more lines to receive an interrogation signal from the decoder and having a single word line on which each of the positions provides a match or no match signal whereby a particular logic function of two or more variables can be performed on the binary input signals by selection of the data stored in the multi-state cell.

2. The functional memory of claim 1 wherein said decoder has $n$ inputs and decodes to one of the $2^n$ outputs.

3. The functional memory of claim 1 wherein each of the positions comprises a bistable circuit.

4. The functional memory of claim 1 wherein each two positions comprises a quadra state circuit.

5. The functional memory of claim 1 wherein said decoder is a threshold decoder.

6. The functional memory of claim 5 wherein each of the inputs of the decoder is given equal weight.

7. The functional memory of claim 5 wherein at least one of the inputs of the decoder is given a different weighted value.

8. The functional memory of claim 1 including for each word line a plurality of OR circuit inputs which can be selectively coupled or uncoupled to that word line to perform logic on the output of the storage cells and which are coupled to other OR circuit inputs connected to other word lines in the matrix to form a matrix of programmable OR circuits.

9. The functional memory of claim 8 including a latch circuit for each of at least some output lines of OR circuits said latch circuit selectively coupled or uncoupled to that output line to form a matrix of programmable latches.

10. In a functional memory in which data in storage cells arranged in a matrix is interrogated with interrogating signals placed on the bit lines for the cells and responds to the interrogation by placing a match or no match signal on the word lines of the cells, comprising:

a. a plurality of decoders each for addressing the bit lines of a different group of cells in the matrix to generate interrogation signals from the input signals with at least one of the decoders in the plurality of decoders for decoding at least two binary input signals and their complements into a binary interrogating signal of three or more digits at the output of said one of the decoders, and b. at least one cell in the matrix which has more than four states arranged in a plurality of two-state positions each with a bit line coupled to the output of said one of the decoders to receive one of the digits of the interrogating signal from said one of said decoders, said cell with more than four states being coupled to a single word line on which either a match or no match signal is provided in response to any combination of digits in the binary interrogation signal of three or more digits whereby a number of particular logic functions of two or more variables can be performed on the two binary input signals by selection of the data stored in the one cell with more than four states.

* * * * *